United States Patent [19]
Tanikoshi

[11] 3,831,072
[45] Aug. 20, 1974

[54] DC MOTOR WITH HALL GENERATORS
[75] Inventor: Kinzi Tanikoshi, Tokyo, Japan
[73] Assignees: Canon Kabushiki Kaisha; Canon Seiki Kabushiki Kaisha, both of Tokyo, Japan
[22] Filed: Feb. 14, 1973
[21] Appl. No.: 332,523

[30] Foreign Application Priority Data
Feb. 21, 1972 Japan.............................. 47-17813
Feb. 21, 1972 Japan.............................. 47-17814

[52] U.S. Cl. ............................. 318/138, 318/290
[51] Int. Cl. ................................ H02k 29/00
[58] Field of Search.... 318/138, 139, 254, 288–290, 318/297, 298, 300, 439, 685, 695, 696

[56] References Cited
UNITED STATES PATENTS
| | | | |
|---|---|---|---|
| 3,518,517 | 6/1970 | Rainer .......................... | 318/290 X |
| 3,541,408 | 11/1970 | Schwendtner et al. ............. | 318/138 |
| 3,652,909 | 3/1972 | Rainer et al. ................... | 318/138 X |
| 3,719,870 | 3/1973 | Bregeault........................... | 318/138 |

*Primary Examiner*—Robert K. Schaefer
*Assistant Examiner*—W. E. Duncanson, Jr.
*Attorney, Agent, or Firm*—Fitzpatrick, Cella, Harper & Scinto

[57] ABSTRACT

DC motor and control system therefor utilizing Hall generators are disclosed. A stator has a pair of flux-producing windings positioned in torque-producing relation with a rotor having magnetic poles of opposite polarities. A pair of Hall generators are positioned in flux-sensing relation with the poles on the rotor, and driving means for applying the currents to the stator windings is connected to a switching or commutation circuit which is actuated in response to the output signal from a control signal generating circuit so that the direction of the current flowing through the Hall generators may be automatically reversed, thereby automatically reversing the rotation of the rotor.

24 Claims, 13 Drawing Figures

$\frac{\pi}{2}$ $\pi$ $\frac{3}{2}\pi$ $2\pi$

DC MOTOR WITH HALL GENERATORS

BACKGROUND OF THE INVENTION

1. Field of the Invention

The present invention relates to a motor with Hall generators of the type in which a driving circuit comprising transistors is actuated in response to the output signals from Hall generators which detect the angular position of a rotor of a permanent magnet of the motor so as to produce a rotary magnetic field for rotating the rotor. 2. Description of the Prior Art The electric signals which appear at the output terminals of a Hall generator when a magnetic field is applied thereto are applied to a control circuit for sequentially energizing or commutating the windings on a stator of a motor. There has been known the prior art motor with Hall generators of the type in which the Hall generators are positioned adjacent to the rotor of a permanent magnet so as to detect the angular position thereof. In the prior art motor Hall generators more than four independent windings are positioned in torque producing relation with the rotor. The current flowing through each of the windings is intermittently interrupted in response to the output signal of the Hall generators which in turn varies depending upon the angular position of the rotor. Therefore the current flow through each of the windings is interrupted for a considerably long time so that the prior art motor with the Hall generator has a defect that the efficiency of the windings is low.

In order to reverse the direction of rotation of a brushless DC motor with Hall generators there has been known the method for switching the direction of current flow through the Hall generators or the method for switching the direction of the current flowing through the windings of the stator. The former method has a defect that the control circuit is complex in construction and the latter method has the defects that a circuit construction of switching means is also complex and that the connecting terminals are increased in number as the number of windings is increased.

SUMMARY OF THE INVENTION

One of the objects of the present invention is therefore to overcome the problems and defects encountered in the prior art motors.

Another object of the present invention is to provide a motor with Hall generators of the type in which in response to the output signals of a switching or commutation circuit for controlling the reversal of the rotation of the motor the direction of the current flowing through the Hall generators is controlled.

Another object of the present invention is to provide a motor with Hall generators of the type in which a driving circuit for controlling the energization of windings on the stator depending upon the stator winding configuration is connected to the Hall generators, and a switching or commutation circuit for controlling the Hall generators thereby reversing the direction of rotation of the motor is provided together with a logical output generator which controls the switching or commutation circuit.

Another object of the present invention is to provide a motor with Hall generators adapted to be used in a closed loop servo system in which means for detecting the rotational speed of the motor is connected to the logical output generator of the type described above so that the output signal from the logical output generator may become zero.

Another object of the present invention is to provide a motor with Hall generators of the type in which the output signal of means for detecting the rotational speed of the motor is fed back so as to damp or brake the motor.

The above and other objects, features and advantages of the present invention will become more apparent from the following description of some preferred embodiments thereof taken in conjunction with the accompanying drawing.

DESCRIPTION OF THE PREFERRED EMBODIMENTS

FIRST EMBODIMENT, FIGS. 1A AND 1B

Figure 1B:
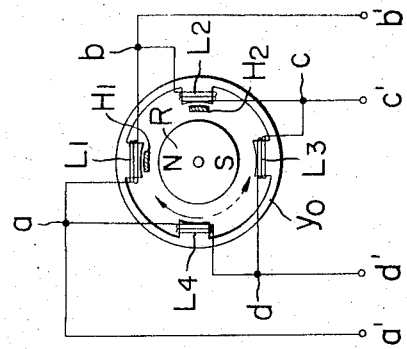
FIG. 1B is a front view of a rotor, a stator and Hall generators used in the embodiment shown in FIG. 1A.

First referring to FIGS. 1A and 1B, the first embodiment of a DC motor with Hall generators in accordance with the present invention will be described. The DC motor proper comprises a rotor R having a pairs of magnetic poles of opposite polarities, flux-producing windings L1–L4 interconnected so as to form a ring connection and positioned in torque-producing relation with the rotor, and a single pair of Hall generators H1 and H2 positioned in fixed relation with the rotor R and angularly spaced apart from each other by an angle equal to an electrical angle between the magnetic poles of 90° on the rotor and in a magnetic relation to the rotor so as to sense the magnitude of the rotor flux density as a function of angular position of the rotor. The interconnection between the stator windings L1–L4 is illustrated in detail in FIG. 1B. That is, each of the windings W1–W4 is mounted on the yoke Yo of a magnetic material, and the junctions $a$, $b$, $c$, and $d$ are connected to a motor driving circuit to be described in detail hereinafter. The motor proper shown in FIG. 1B is electrically connected at the terminals $a'$, $b'$, $c'$ and $d'$ to the junctions $a, b, c$, and $d$ shown in FIG. 1A.

The Hall generators H1 and H2 has input terminals $a1$ and $b1$ and $c1$ and $d1$ and output terminals $e$ and $f$ and $g$ and $h$, respectively.

PNP transistors Q1 and Q2 and NPN transistors Q3 and Q4 constitute a switching or commutation circuit CH for switching or reversing the currents flowing through the Hall generators H1 and H2. The input terminals $a1$ and $b1$ of the Hall generators H1 and H2 are connected through resistors R1 and R3 to a common collector circuit of the transistors Q1 and Q3 whereas the other input terminals $b1$ and $d1$ are connected resistors R2 and R4, respectively, to a common collector circuit of the transistors Q2 and Q4. Diodes D1 and D2 which functions to prevent the reverse currents are inserted between the collectors of the transistors Q1 and Q3 and between the collectors of the transistors Q2 and Q4, respectively. The base of the transistor Q1 is connected to the collector of the transistor Q4 whereas the base of the transistor Q2, to the collector of the transistor Q3. The bases of the transistors Q3 and Q4 are connected to a logical output generating means to be described in detail hereinafter.

The driving circuit comprises four pairs of transistors Q5 and Q6; Q7 and Q8; Q9 and Q10; and Q11 and Q12 for energizing the flux-producing windings L1–L4. Diodes D3~D6 which serve to prevent the counter currents are inserted between the junctions $a', b', c'$ and $d'$ and the collectors of the transistors Q5, Q7, Q9 and Q11, respectively. The emitters of the transistors Q6, Q8, Q10 and Q12 are connected through an ON-OFF switch S to the positive terminal of a DC power source E whereas the collectors thereof are connected respectively through the collector-emitter paths of their associated transistors $Q_5$, $Q_7$, $Q_9$ and $Q_{10}$ to the negative terminal of the DC power source, as shown in FIG. 1A.

Next the mode of operation of the DC motor with Hall generators will be described. It is assumed that the positive polarity signal be applied from the logical output generating means to the input terminal A1 of the switching or commutation circuit CH and the ON-OFF switch S be closed. Then the transistor Q3 is conducted so that the transistor Qz is also conducted. As a result the current flows through the Hall generators in the directions indicated by the solid arrows. In this case it is further assumed that the rotor R be positioned as shown in FIG. 1A where the pole N of the rotor is in opposed relation with the Hall generator H1. Then the potential at the output terminal $e$ of the Hall generator H1 becomes higher than the potential at the output terminal $f$, and the output signal of the Hall generator H1 is applied to the bases of the transistors Q5 and Q7 in the driving circuit so that the transistor Q5 is conducted but the transistor Q7 is cut off. As a result the transistor Q6 is conducted whereas the transistor Q8 is cut off so that the circuit starting from the positive terminal of the DC power source E through the transistor Q6, the junction $c$, a parallel circuit

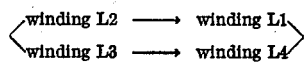

the junction $a$, the diode D3, and the transistor Q5 ending at the negative terminal of the power source E is established. Therefore the torque for causing the rotor R to rotate in the direction of the solid arrow is produced.

Next when the pole N of the rotor R comes into a position opposed to the Hall generator H2 as the rotor R rotates, the potential at the output terminal $g$ of the Hall generator H2 becomes higher than the potential at the output terminal $h$ so that the transistors Q9 and Q10 in the driving circuit are conducted. As a result an electric circuit starting from the positive terminal of the power source E through the transistor Q10, the junction $b1$, the parallel circuit,

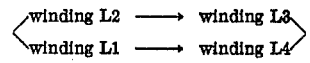

the junction $d$, the diode D5, and the transistor Q9 ending at the negative terminal of the power source E is established. Therefore the rotor R continues its rotation in the direction indicated by the solid arrow.

When the pole S of the rotor R is in opposed relation with the Hall generator H1, the commercial voltage appears at the output terminal $f$ of the Hall generator H1 so that the transistors Q7 and Q8 are conducted. Therefore an electric circuit starting from the positive terminal of the power source E via transistor Q8, the junction $a$, the parallel circuit

the junction $c$, the diode D4 and the transistor Q7 ending at the negative terminal of the power source E is established. As a result the rotor R is further rotated in the direction indicated by the solid arrow.

When the pole S of the rotor R comes in opposed relation with the Hall generator H2, the high potential appears at the output terminal $h$ of the Hall generator H2 so that both the transistors Q11 and Q12 are conducted. Therefore an electric circuit starting from the positive terminal of the power source E via the transistor Q12, the junction $d$, the parallel circuit

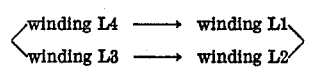

the junction $b$, the diode D6 and the transistor Q11 ending at the negative terminal of the power source E is established. Therefore the rotor R still continues to rotate in the direction indicated by the solid arrow. Thus the rotor may continue to rotate in the direction indicated by the solid arrow.

Next when the positive signal is applied to the input terminal A2, the current flows through the Hall generators H1 and H2 are reversed in the direction opposite to the arrows so that when the pole N of the rotor R is in opposed relation with the Hall generator H1 the potential at the output terminal $f$ becomes higher whereas when the pole S is in opposed relation with the Hall generator H1 the potential at the output terminal $e$ becomes higher. But when the poles N and S of the rotor R are in opposed relation with the Hall generator H2, the outputs of the Hall generator H2 are opposite to those obtained from the Hall generator H1. Therefore the rotor R rotates in the direction indicated by the broken arrows, that is in the direction opposite to the solid arrow. Since the driving currents always flow through the windings L1–L4, the torque produced by the DC motor may be considerably improved, and the rotation of the rotor R may be reversed in direction in a simple manner only by applying the signal to the input terminal A1 or A2.

Figure 1A:
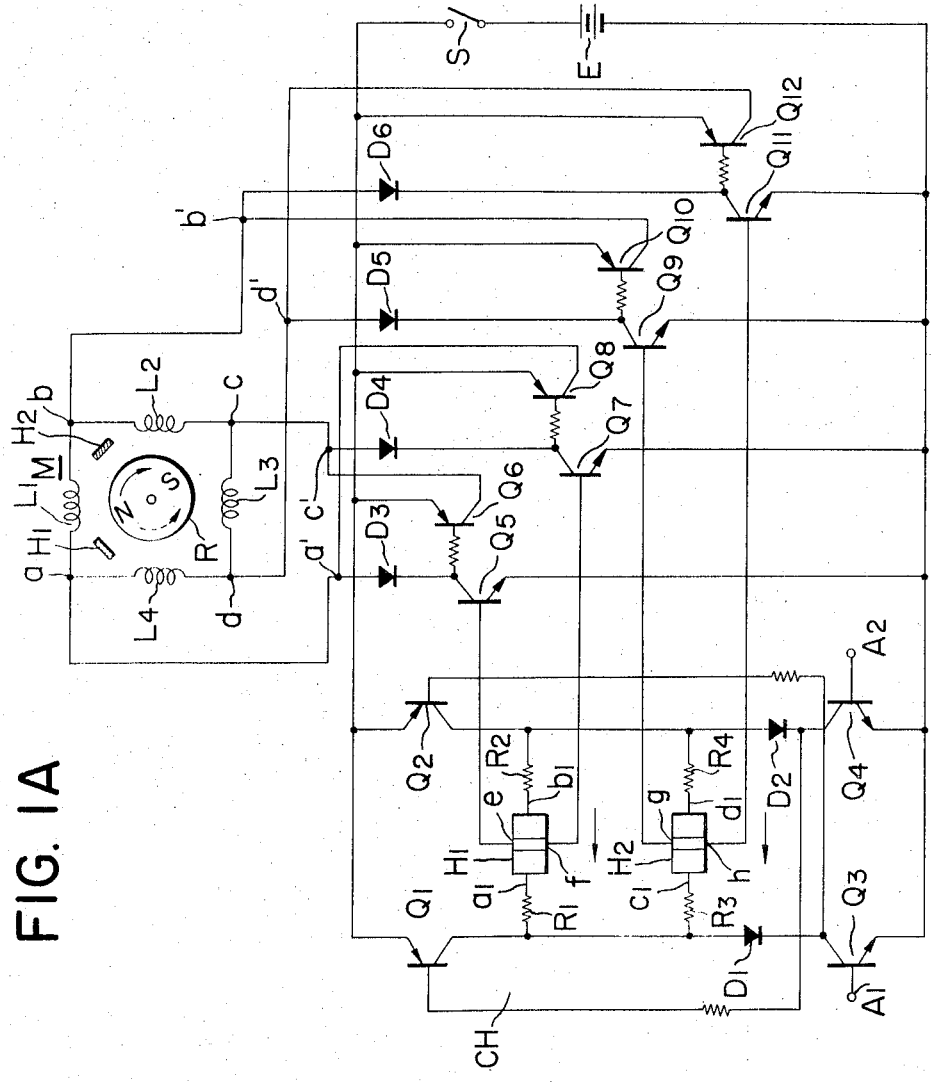
FIG. 1A is a circuit diagram of a first embodiment of a motor with Hall generators in accordance with the present invention.

A servo system may be provided incorporating the DC motor of the type described so far with reference to FIGS. 1A and 1B in which the rotor may be rotated in the forward or reverse direction by applying the input signal to the input terminal A1 and A2 of the switching circuit CH from the logical input generating means such as a digital signal generating means so that a bridge circuit may be balanced.

SECOND EMBODIMENT, FIG. 2

Figure 2:
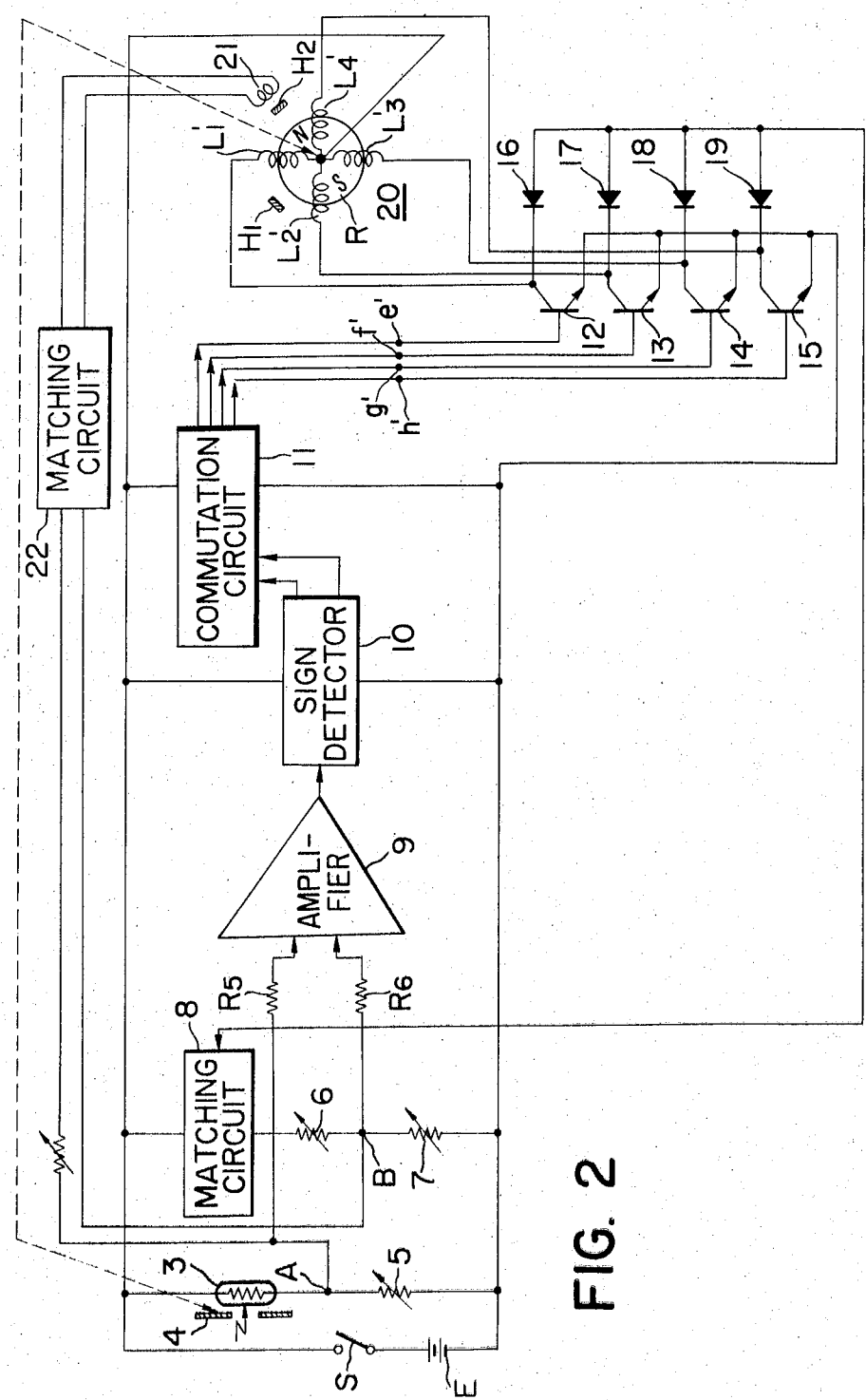
FIG. 2 is a circuit diagram of a second embodiment of the present invention with a servo system.

The second embodiment shown in FIG. 2 is adapted for use especially with an automatic aperture control device for cameras. Unlike the windings L1–L4 in the first embodiment, the winding in the second embodiment are star connected, but it is seen that the ring connection motor may be provided when the output terminals $e, f, g$, and $h$ of the Hall generators shown in FIG. 1 are connected to the junctions $e', f', g'$ and $h'$ shown in FIG. 2, respectively.

The logical output generating means for giving the input signals to the switching or commutation circuit which controls the direction of the current flow flowing through the Hall generators comprises a bridge circuit in the second embodiment shown in FIG. 2 comprising a photoelectric element 3, and variable resistors 5, 6 and 7. The photoelectric element 3 is positioned behind an aperture means 4 which control the light from a subject so that the resistance across the photoelectric element 3 varies depending upon the intensity of light impinged thereupon. The variable resistors 5, 6 and 7 are controlled so as to represent the exposure factors which must be preset. A matching circuit 8 connected to one arm of the bridge circuit controls the speed of the DC motor. That is the matching circuit 8 controls the level of the input signal to be applied to the bridge circuit in response to the signal representing the rotational speed of the rotor so that the rotor may be applied with the braking or retarding force.

The output terminals A and B of the bridge circuit are connected through resistors R5 and R6, respectively, to an operational amplifier 9 whose output terminal is connected to an output sign detecting circuit 10 which detects the sign of the input signal applied thereto so as to determine to which of the two output systems is applied the output signal. The two output terminals of the sign detecting circuit 10 are connected to the switching or commutation circuit 11 comprising the Hall generators H1 and H2 and the two pairs of transistors Q1 and Q2; and Q3 and Q4. The output terminals of the switching or commutation circuit 11 are connected to the bases of transistors 12, 13, 14, and 15 which constitute the driving circuit. The output terminals or collectors of these transistors 12–15 are connected to the four stator windings L1'–L4' which are star-connected. The rotor of the motor 20 has a pair of poles N and S, and the common emitter terminal of the transistors 12–15 is connected to the negative terminal of the power source E whereas the collectors are connected through diodes 16–19 to the matching circuit 8. The diodes 16–19 serve to detect the speed of the motor. The common terminal of the windings L1'–L4' in the star connection is connected to the positive terminal of the power source E through the on-off switch S.

Like those Hall generators in the first embodiment shown in FIG. 1, they are angularly spaced apart by 90°, and a coil 21 for detecting the rotation speed of the rotor is mounted on each of the windings L1'–L4' and connected through a matching circuit 22 such as an impedance element to the output terminals A and B of the bridge circuit.

Next the mode of operation of the second embodiment with the above arrangement will be described. First when the bridge circuit consisting of the photoelectric element 3 and the variable resistors 5, 6, and 7 is unbalanced, there exists a difference between the output voltages appearing at the output terminals A and B. The difference in potential between the output terminals A and B is amplified by the operational amplifier 9 so that the positive or negative output voltage may be derived and applied to the sign detecting circuit 10. The two output signals of the sign detecting circuit 10 are applied to the two input terminals of the switching or commutation 11 including the two Hall generators H1 and H2. The reason why the rotation of the servomotor is reversed has been already described hereinbefore. The output signals of the two Hall generators H1 and H2 vary as the rotor rotates and the switching or commutation circuit 11 so sequentially actuates the transistors 12–15 in the driving circuit so that the wings L1'–L4' are energized so as to rotate the rotor in the forward or reverse direction. Therefore the aperture control means 4 which is drivingly coupled to the DC motor 20 is so controlled as to vary the light incident upon the photoelectric element 3, thereby balancing the bridge circuit. In this case the counterelectromotive forces produced in the driving circuit are detected by the diodes 16–19 so as to feed back them to the bridge circuit, thereby actuating the matching circuit 8. Therefore the servomotor 20 is braked or retarded.

Furthermore the voltage induced across the detecting coil 21 mounted on the windings L1'–L4' may be applied to the output terminals A and B of the bridge circuit through the matching circuit 22 so that the rotation of the servomotor 20 may be retarded. When the windings L1'–L4' are in the ring connection the driving circuit of the type described hereinbefore with reference to FIG. 1 may be used.

THIRD EMBODIMENT, FIG. 3

Figure 3:
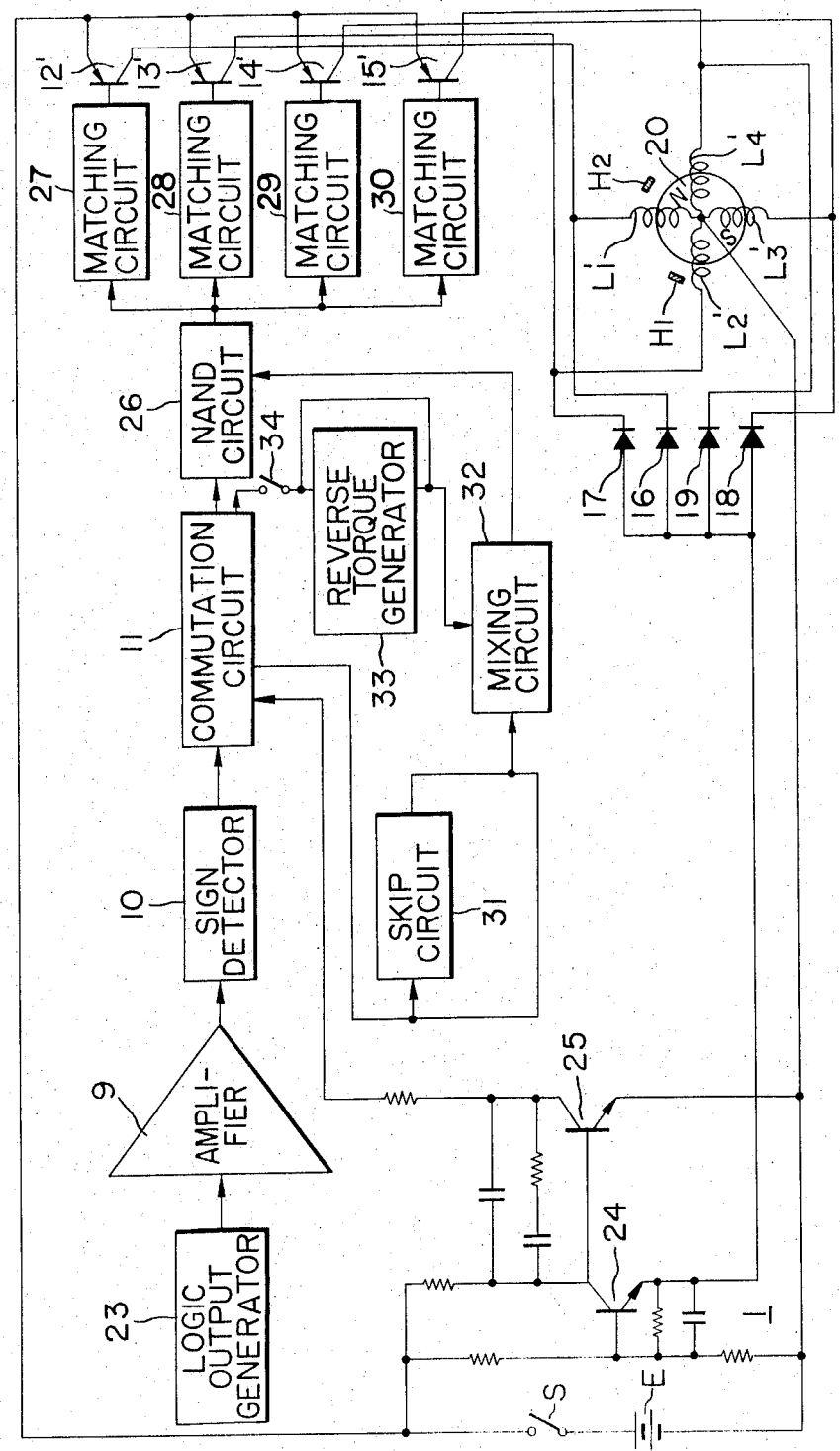
FIG. 3 is a circuit diagram of a third embodiment of the present invention.

The third embodiment shown in FIG. 3 is provided with a skip circuit and a reverse torque generator in order to prevent the servomotor from rotating at a too fast speed, and same reference numerals are used to designate the component parts similar to those described in the second embodiment with reference to FIG. 2. The component parts common with the second embodiment will not be described in detail in the third embodiment.

The logical output generating means 23 comprises a Wheatstone bridge circuit or comparator and has its output terminal connected to the amplifier 9. The motor 20 is similar in construction to that shown in FIG. 2, but the motor of the type shown in FIG. 1A may be also used. The driving circuit comprises transistors 12'–15' which are connected to the windings L1'–L4' respectively. The diodes 16–19 which detect the voltage in order to apply the brake to the motor are connected to the input terminal of a brake control circuit 1 comprising transistors 24 and 25. The output terminal of the control circuit 1 is connected to the input terminal of the commutation circuit 11 including the Hall generators H1 and H2.

The output terminals of matching circuits 27–30 are connected to the bases of the transistors 12'–15' whereas the input terminals are connected through a NAND circuit 26 to the switching or commutation circuit 11. The output terminal of the switching or commutation circuit 11 is connected to the input terminal of a skip circuit 31 which is adapted to skip a predetermined sequence of energization of the stator windings L1'–L4', and the output terminal of the skip circuit 31 is connected to a mixing circuit 32 whose output terminal is connected to the input terminal of the NAND circuit 26. The switching or commutation circuit is also connected through a switch 34 to the input terminal of the reverse torque generator 33 which so energizes the windings L1'–L4' that the reverse torque may be produced. The output terminal of the reverse torque generator 33 is connected to the mixing circuit 32.

The general mode of operation of the third embodiment is substantially similar to that of the second embodiment described hereinbefore with reference to FIG. 2 except the operations for producing the reverse torque and skipping to the described in detail hereinafter.

One of the important features of the third embodiment is that the voltages across the windings L1'–L4' are fed back through the diodes 16–19 and the control circuit consisting of the transistors 24 and 25 to the switching or commutation circuit 11 including the two Hall generators H1 and H2. Assume that the rotational speed of the rotor be exceedingly increased. Then the high voltages across the windings L1'–L4' are applied to the control circuit consisting of the transistors 24 and 25 and the output signal of the control circuit in turn is applied to the switching or commutation circuit 11. In response to the output signal of the commutation circuit 11 the skip circuit 31 is actuated so that the output signal thereof is applied to the NAND circuit 26 through the mixing circuit 32. Therefore in response to both the output signals from the mixing circuit 32 and the switching or commutation circuit 11 and NAND circuit 26 and the matching circuits 27–30 are actuated so as to sequentially drive the transistors 12'–15'. Thus a predetermined sequence of energization of the windings L1'–L4' may be suitably skipped so that the rotational speed of the motor 20 may be reduced.

Furthermore when the switch 34 is closed the output of the reverse torque generator 33 is applied to the mixing circuit 32. Therefore the NAND circuit 26 controls the driving circuit so that the windings L1'–L4' are so energized as to produce the reverse torque. Thus the servomotor may be prevented from rotating at an exceeding high rotational speed.

Figure 4:
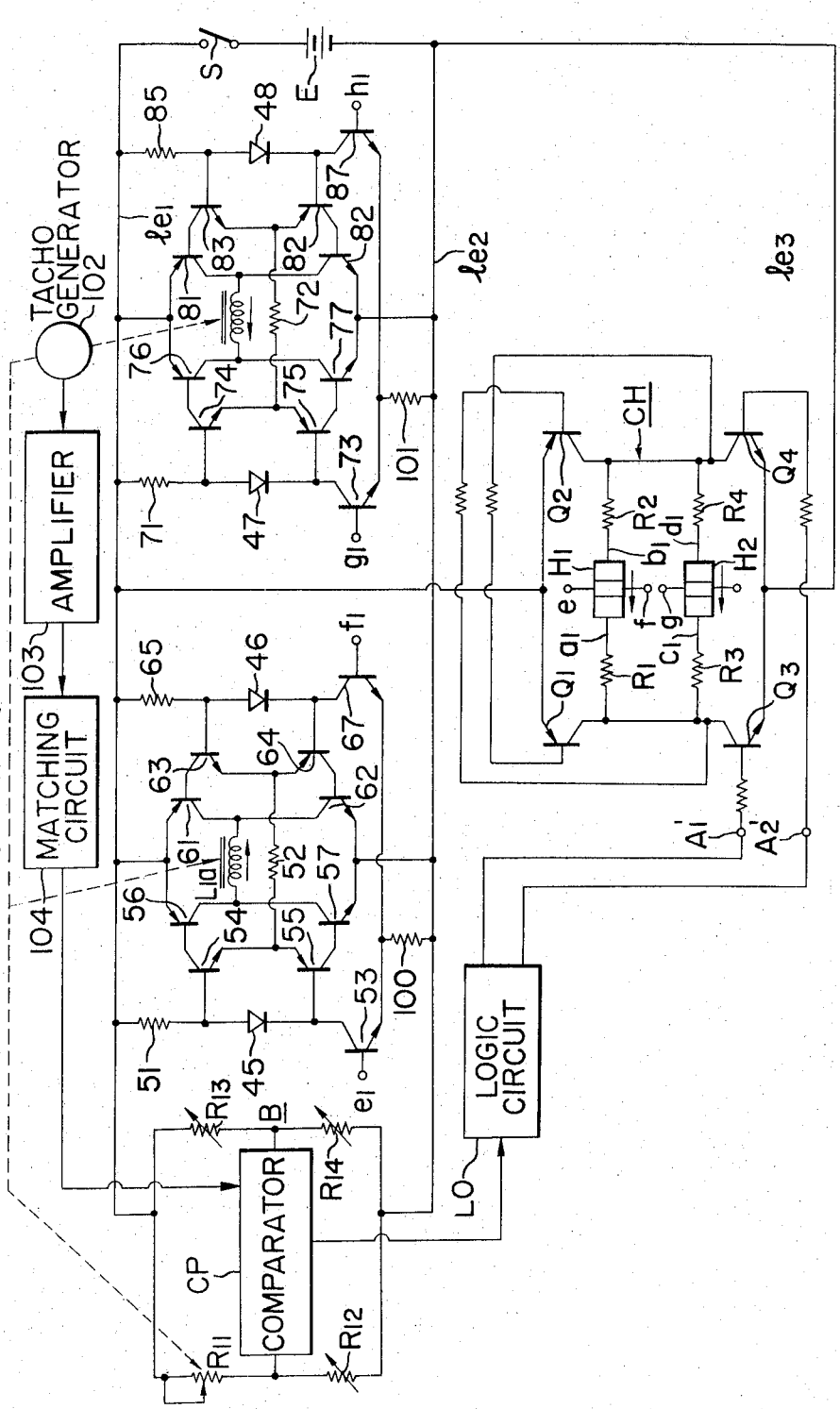
FIG. 4 is a circuit diagram of a fourth embodiment of the present invention in which two independent windings are mounted on a stator.
Figure 6:
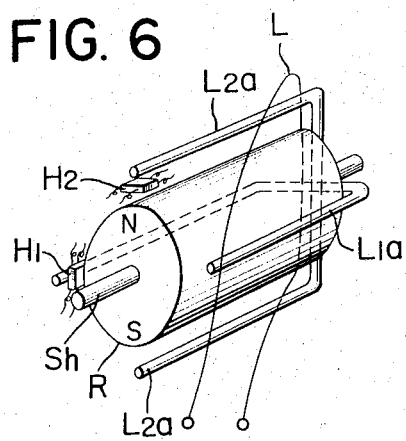
FIG. 6 is a perspective view of a rotor, stator windings and Hall generators of the motor shown in FIG. 4.

FOURTH EMBODIMENT, FIGS. 4,6 and 7

Referring to FIGS. 4,6 and 7 the fourth embodiment will be described in which the stator has a single pair of windings and the DC motor is used as a servomotor in a servosystem.

First referring to FIG. 6, the construction of the motor proper will be described. The rotor R is rotatably supported by a shaft $sh$ and has the magnetic poles of opposite polarities N and S. The stator has a first and second flux-producing windings L1$a$ and L2$a$ electrically displaced by 90° relative to the rotor poles and positioned in the rotor R in the torque-producing relation with the rotor. The two Hall generators H1 and H2 are angularly spaced apart from each other by 90° which is equal to the electrical angles between the poles of the rotor R. A winding L of a tacho generator is wound around the windings L1$a$ and L2$a$ at angles in order to detect the rotational speed of the rotor R.

Referring to FIG. 4 the logic output generating means comprises the bridge circuit comprising variable resistors R11,R12,R13 and R14 and a comparator $cp$ which may be of the conventional differential amplifier type. There is provided a servosystem in which the signal representing the rotational speed of the motor is fed back so that the resistance of the variable resistor R11 may be varied in response to the variation in speed of the motor. The output terminals A and B of the bridge circuit are connected to the input terminals of the comparator $cp$ the output terminal of which is connected to the input terminal of a logic circuit LO. The output terminals of the logical circuit LO are connected through the terminals A1' and A2' to the bases of the transistors Q3 and Q4 respectively, of the input stage of the switching or commutation circuit CH whose arrangement and function are similar to those described with reference to FIG. 1A.

Next a pair of driving circuits which have the input terminals $el, fl, gl,$ and $hl$ connected to the output terminals $e, f, g$ and $h$ respectively of the Hall generators H1 and H2 in the switching or commutation circuit CH will be described. Resistors 51, 65, 71 and 85 are load resistors of transistors 53,67,73 and 87 of the first stage, and diodes 45,46,47 and 48 are inserted between the load resistors 51,65,71 and 85 and the collectors of the transistors 53,67,73 and 87. Four pairs of transistors 54 and 55;63 and 64;74 and 75, and 83 and 84 constitute the complementary amplifiers in the driving stages, and the two groups of transistors 56,57,61 and 62; and 76,77, 81 and 82 constitute the output stages. Resistors 52 and 72 which serve to prevent the excess current are interconnected between the common emitter junctions between the transistors 54 and 55 and 63 and 64 and between the common emitter junctions between the transistors 74 and 75 and 83 and 84, respectively. Between the common emitter junctions between the transistors 53 and 67; and 73 and 87 and the lead wire $le2$ are inserted resistors 100 and 101 respectively.

The tacho generator 102 has a coil L (See FIG. 6) which rotates in unison with the rotor, and an amplifier 103 which detects the output of the tacho generator is connected through a matching circuit 104 which is inserted for impedance matching or the like to the comparator $cp$ interconnected between output terminals A and B of the bridge circuit.

Next the mode of operation will be described. Assume that the bridge circuit be unbalanced so that the output voltage at the terminal A1' which is derived through the comparator $cp$ and the logic circuit LO is higher than the output voltage at the terminal $A_2'$. The logic output generator will be described in more detail hereinafter. Then the transistor Q3 in the input stage of the switching or commutation circuit CH is conducted, but the transistor Q4 remains turned off. The transistor Q2 is conducted so that an electric circuit leading from the lead wire $le1$ connected to the positive terminal of the power source E—the transistor Q2—the parallel circuit ⟨resistor R2—Hall generator H1—resistor R1⟩
⟨resistor R4—Hall generator H2—resistor R3⟩

—the transistor Q3—and to the lead wire $le3$ connected to the negative terminal of the power source E is established. Therefore the current flows through the winding $L2a$ in the direction indicated by the solid arrow so that the rotor R rotates in the clockwise direction.

Figure 7A:
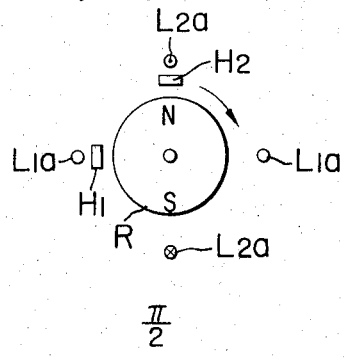
FIGS. 7A–7D illustrate the direction of the current flowing through the windings of the motor shown in FIG. 4 or 6 at four equiangularly spaced-apart positions in the rotation of the rotor.
Figure 7B:
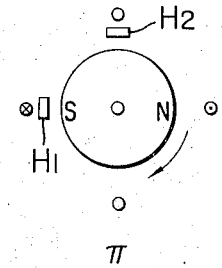

When the S pole of the rotor R is in opposed relation with the Hall generator H1 as shown in FIG. 7B, the output voltage at the terminal $e$ of the Hall generator becomes higher than that at the terminal $f$ so that the transistor 67 is conducted. Therefore the electric circuit leading from the positive terminal of the power source E via the lead wire $le1$, the transistor 56—the winding $L1a$—transistor 62 to the lead wire $le2$ is established so that the current flows through the winding $L1a$ in the direction indicated by the solid arrow to produce a clockwise torque and rotation of the motor.

Figure 7C:
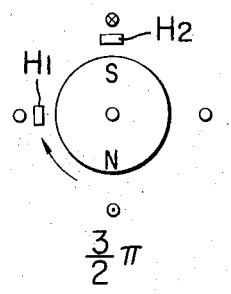

When the rotor R rotates through $3/2\pi$ so that the S pole of the rotor is in opposed relation with the Hall generator H2 as shown in FIG. 7C, the voltage at the output terminal $h$ thereof becomes higher than that at the terminal $g$. Then the transistor 87 is conducted so that the transistors 84,82,76 and 74 are all conducted. As a result the electric circuit leading from the positive terminal of the power source E via lead wire $le1$—transistor 76—winding $L2a$—transistor 82—lead wire $le2$ to the negative terminal of the power source E is established so that the current flows through the winding $L2a$ in the direction opposite to that indicated by the arrow. Consequently the clockwise rotation of the rotor is continued.

Figure 7D:
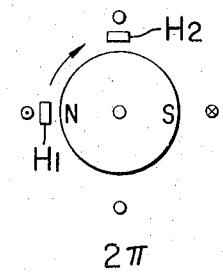

When the N pole of the rotor comes into opposed relation with the Hall generator H1 as the rotor rotates through $2\pi$ radians as shown in FIG. 7D, the output voltage at the terminal $f$ of the Hall generator H1 becomes higher than that at the terminal $e$ so that the transistor 53 is conducted. Therefore the transistors 57,61, and 63 are conducted so that the electric circuit leading from the positive terminal of the power source E via lead wire $le1$—transistor 61—winding $L1a$—transistor 57—lead wire $le2$ to the negative terminal of the power source E is established. As a result the current flows through the winding $L1a$ in the direction opposite to that indicated by the arrow so that the clockwise rotation of the rotor is continued. In the manner described above the driving current is commutated so that the rotor continues to rotate in the clockwise direction as long as the bridge circuit is unbalanced and stops when the bridge circuit is completely or substantially balanced.

The mode of operation when the output voltage at the terminal $A2'$ becomes higher than that at the terminal $A1'$ will be readily understood by those skilled in the art from the above description so that no detailed description will be made except that the current flows through the Hall generators H1 and H2 in the direction opposite to that indicated by the arrows and the relation of the output voltages at the output terminals of the Hall generators are opposite to that described hereinbefore so that the rotor rotates in the counterclockwise direction.

In the fourth embodiment there is provided a closed loop for detecting the rotational speed of the rotor and feeding back the signal to the logical output generator in order to apply the brake to the motor. The output signal of the tacho generator 102 which detects the rotational speed of the rotor is amplified by the amplifier 103 and applied through the matching circuit 104 to the logical output generator so that the resistance of the variable resistor R11 is varied so as to balance the bridge circuit.

Next the logical output generator which gives the utput signals to be applied to the switching or commutation circuit CH and a circuit for processing the output signals of the logical output generator will be described with reference to FIGS. 4 and 5. The mode of operation of the logic circuit LO (see FIG. 4) is as follows:

The output voltage at the output terminal A of the bridge circuit is i. higher than the output voltage at the terminal B,
ii. lower than the output voltage at the terminal B, or
iii. equal to the output voltage at the terminal B.

The logic circuit LO gives the signals

"1" at the terminal $A1'$, but "0" at the terminal $A2'$ in case of ($i$),
"0" at the terminal $A1'$ but "1" at the terminal $A2'$ in case of (ii) or
"0" at both terminals $A1'$ and $A2'$ where "1" represents the output voltage higher than the threshold voltage of the transistors Q3 and Q4, and
"0" represents the output voltage lower than the threshold voltage.

The fourth embodiment is further provided with a switching circuit 105 (see FIG. 5C) interconnected between the output terminals $e$–$h$ of the Hall generators H1 and H2 and the input terminals $e1$–$h1$ of the driving circuit in order to attain the skipping operation described in the third embodiment with reference to FIG. 3. A preset programmer 106 and a variable pulse generator 108 are connected to the switching circuit 105 in order to actuate the latter. That is the switching circuit 105 is actuated in response to the signal of positive polarity ("1") from the variable pulse generator 108 so that the switches are closed in response to the output signals from the logic output generator 107 thereby transmitting the signals to the driving circuit.

In the system in which the windings $L1a$ and $L2a$ are sequentially energized and the rotational speed of the motor excessively increases in response to the high logical output signals, damping means must be provided. For this purpose the fourth embodiment is provided with the preset programmer 106 which changes or skips the sequence of energization of the windings $L1a$ and $L2a$ in response to the level of the output signal of the logic output generator 107. Therefore the problems inherent to the servomotors such as hunting may be eliminated and the stability of the servosystem may be ensured.

Figure 5A:
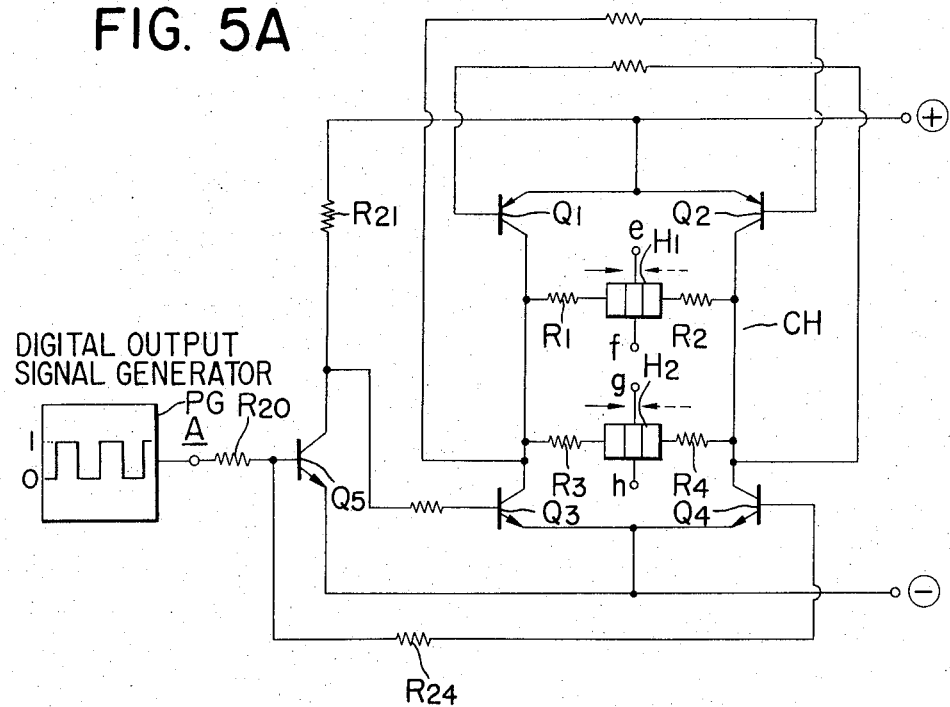
FIG. 5A is a circuit diagram of a variation of a switching or commutation circuit shown in FIG. 4 which controls the forward and reverse rotation of the motor by the digital method.
Figure 5B:
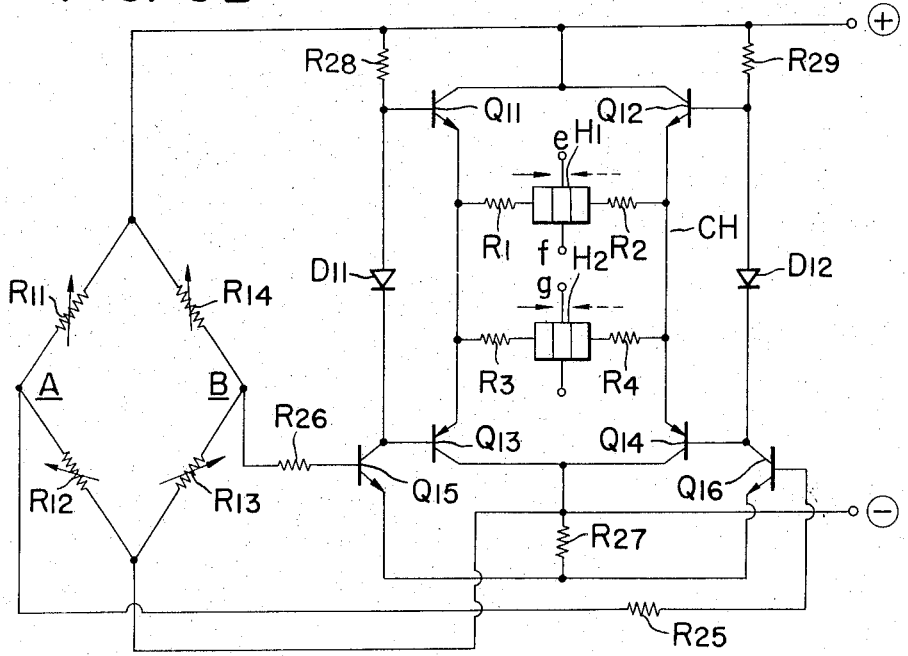
FIG. 5B is a circuit diagram of another variation thereof adapted for effecting the analog control.
Figure 5C:
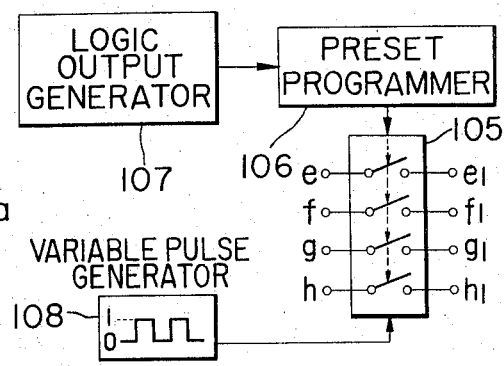
FIG. 5C is a block diagram of a variation of a logical output generator shown in FIG. 4.

Variations of Logical Output Generator of FIG. 4, FIGS. 5A and 5B:

FIG. 5A shows a diagram of a circuit for detecting the output signals of the logical output generator in order to determine the direction of rotation of the motor. The components parts similar to those used in the fourth embodiment shown in FIG. 4 are designated by the same reference numerals. A digital signal generator PG which outputs the digital signals "1" and "0" is connected to the input terminal A which is in turn connected through a resistor R20 to the base of the switching transistor Q5 which functions as an inverter. The base is also connected through a resistor R24 to the base of the transistor Q4 in the switching or commutation circuit. The emitter of the transistor Q5 is connected to the negative terminal of the power source whereas the collector, to the positive terminal of the power source through a resistor R21 and to the base of the transistor Q3 through a resistor R23. Except the above arrangement described the switching or commutation circuit CH is substantially similar to that shown in FIG. 4. The output terminals $e, f, g$ and $h$ of the Hall generators H1 and H2 connected to the output terminals of the switching or commutation circuit may be connected to the input terminals of the driving circuit of the type shown in FIG. 1 or 4.

Next the mode of operation will be described. The digital signal from the digital output signal generator PG is applied to the terminal A. In response to the digital input "1" the motor is reversed whereas in response to the digital signal "0" the motor is rotated in the clockwise direction. The angle of rotation of the rotor of the motor may be controlled in response the number of the digital signals in the form of pulsses.

When the signal "1" appears at the terminal A, the transistor Q5 is conducted so that its collector voltage is reduced. Therefore the transistor Q3 remains turned off. The signal "1" is also applied through the resistor R24 to the base of the transistor Q4 so that the latter is conducted. As a result the transistor Q1 is also conducted so that the current flows through the Hall generators H1 and H2 in the direction indicated by the solid arrow. Therefore the motor may be reversed in a manner substantially similar to that described hereinbefore.

When the signal "0" appears at the terminal A, both the transistors Q4 and Q5 are turned off so that the collector potential of the transistor Q5 rises. As a result the transistors Q3 and Q2 are conducted so that the current flows through the Hall generators H1 and H2 in the direction indicated by the broken arrows. Therefore the motor rotates in the clockwise direction.

Another variation shown in FIG. 5B is used in a servosystem in which the output of the logical output generator is detected so as to balance a bridge circuit which is the logical generator. This variation is especially adapted to detect the output of the bridge circuit in an analog manner so as to rotate the servomotor in the forward or reverse direction.

In FIG. 5B variable resistors R11~R14 constitute the bridge circuit similar to that shown in FIG. 4, and the variable resistor R11 is controlled in response to the signal representative of the rotational speed of the servomotor so as to attain a preset point. The output terminal A of the bridge circuit is connected through a resistor R25 to the base of transistor Q16 whereas the output terminal B is connected through a resistor R26 to the base of transistor Q15. The transistors Q15 and Q16 constitute a differential amplifier, and their emitters are connected through a resistor R27 to the negative terminal of the power source. The collectors of the transistors Q15 and Q16 are connected to the bases of transistors Q13 and Q14 in the input stage of the commutation circuit, and to the positive terminal of the power source through bias-voltage setting diodes D11 and D12 for transistors Q11 and Q13; and Q12 and Q14, respectively and resistors R28 and R29. Except the arrangement described above the switching or commutation circuit CH is substantially similar to that shown in FIG. 5A and the similar component parts are designated by the same reference numerals.

Next the mode of operation will be described. Assume that the output voltage at the output terminal A of the bridge circuit is higher than that at the output terminal B. Then the transistor Q15 in the differential amplifier is turned off whereas the transistor Q16 is conducted so that the transistors Q13 and Q12 in the switching or commutation circuit remain cut off whereas the transistors Q14 and Q11 are conducted. As a result the electric circuit leading from the positive terminal of the power source via transistor Q11, a parallel circuit

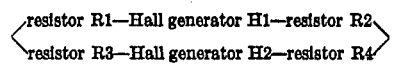

transistor Q14 to the negative terminal of the power source is established. Therefore the current flows through the Hall generators H1 and H2 in the direction indicated by the solid arrow so that the rotor is reversed as in the case of the first and fourth embodiments shown in FIGS. 1 and 4. The resistance of the variable resistor R11 in the bridge circuit is varied in response to the rotational speed of the motor so that the bridge circuit may be balanced. Thus when there is no difference between the output voltages at the output terminals A and B of the bridge circuit, the potentials at the base of the transistors Q15 and Q16 equals each other so that the switching transistors Q14 and Q11 are turned off. As a result the current flows through the Hall generators H1 and H2 are interrupted so that the motor stops its rotation.

When the output voltage at the output terminal A is lower than that at the output terminal B the transistor Q15 is conducted whereas the transistor Q16 is turned off so that the transistors Q13 and Q12 in the switching or commutation circuit are conducted. Therefore an electric circuit leading from the positive terminal of the power source via transistor Q12, a parallel circuit

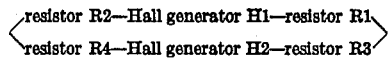

transistor Q13 to the negative terminal of the power source is established so that the current flows through the Hall generators H1 and H2 in the direction indicated by the broken arrows, that is, in the direction opposite to that indicated by the solid arrows. Therefore the motor rotates in the forward or clockwise direction and stops when the bridge circuit is completely or substantially balanced. In response to the level of the output signal appearing at the terminal B or A the conduction of the transistors Q15 and Q16 of the differential amplifier is varied so that the magnitude of the current flowing through the Hall generators H1 and H2 is varied in response to the magnitude of the output voltage of the bridge circuit. That is, an analog servosystem is provided.

As described hereinbefore the present invention provides a switching or commutation circuit for controlling the direction of the current flowing through the Hall generators for the prior art DC motor provided with the Hall generators of the type in which the combination or energization of the torque-producing windings on the stator is controlled by the Hall generators. Furthermore the logical output generator is provided for generating the digital or analog signals to be applied to the switching or commutation circuit so that the direction of the rotation of the DC motor may be automatically reversed. The logical output generator may comprise a Wheatstone bridge circuit so that the signals representative of the rotational speed and direction of the rotation of the motor may be fed back to the bridge circuit, thereby forming a servo system in which the motor may be used as a servomotor. Furthermore, a clamping or braking circuit for preventing the hunting of the motor may be added so as to ensure the stability of the servosystem.

Moreover the stator may have only a single pair of torque-producing windings and the current flow may be reversed in response to the varation in phase so that the efficiency of the windings may be increased. When at least four windings are used the current may be so controlled by the driving circuits connected to the windings as to normally flow through them. Therefore the use of the windings may be increased four times as compared with the prior art DC motors having Hall generators.

It is to be understood that the present invention is not limited to the embodiments described hereinbefore and that various modifications and variations may be effected as the need arises. For example the transistors in the switching or commutation circuit may be replaced by diodes with the similar characteristics and connected in symmetry.

I claim:

1. An electric motor energizable from a source of unidirectional potential comprising
   a. a rotor having magnetic poles of opposite polarities thereon,
   b. a stator member having a pair of flux-producing windings positioned in torque-producing relation with said rotor,
   c. a pair of Hall generators positioned in flux-sensing relationship to said magnetic poles,
   d. current distributing means for applying continuous currents to said stator windings having a corresponding number of current applying circuits to said stator windings connected thereto,
   e. means for connecting each of said Hall generators to said current applying circuits in such a manner that each of said Hall generators supplies a control signal to said current applying circuits to energize said windings and produce a driving torque to said rotor by supplying winding currents,
   f. means for automatically switching the direction of currents flowing through said Hall generators, said means including a switching or commutation circuit comprising symmetrically connected semiconductor elements, said switching or commutation circuit having a pair of input terminals to which are applied the control signals and a pair of output terminals connected to said Hall generators in such a manner that the direction of the currents flowing through said Hall generators may be automatically switched or reversed depending upon whether said control signal is applied to one of said pair of input terminals or the other.

2. An electric motor as defined in claim 1 wherein said means for automatically switching the direction of currents flowing through said Hall generators further comprises control signal generating means connected to said pair of input terminals of said switching or commutation circuit for changing the current supply direction for said Hall genrerators.

3. An electric motor as defined in claim 1 wherein said switching or commutation circuit further comprises
   a first stage comprising a pair of transistors of like polarity and having a pair of input terminals, and a second stage comprising a pair of transistors operatively connected to said transistors in said first stage and having a pair of output terminals connected to said Hall generators.

4. An electric motor as defined in claim 1 wherein said means for automatically switching the direction of currents flowing through said Hall generators further comprises
   digital signal generating means adapted to generate the two signals with different levels and connected to said switching or commutation so as to apply said two different level signals to the input terminals thereof.

5. An electric motor as defined in claim 1 wherein said means for automatically switching the direction of currents flowing through said Hall generators further comprises
   unbalanced output generating means having a pair of output terminals connected to the input terminals of said switching or commutation circuit,
   the sigal appearing at one of said two output terminals of said means being higher in level than the signal appearing at the other output terminal and being applied to one of the pair of input terminals of said switching or commutation circuit so that the direction of current supply for said Hall generators may be controlled.

6. An electric motor as defined in claim 1 wherein said means for automatically switching the direction of currents flowing through said Hall generators further comprises
   a Wheatstone bridge circuit having a pair of output terminals connected to the input terminals of said switching or commutation circuit and at least one variable resistor inserted in one arm thereof,
   said variable resistor being so controlled in response to the rotational speed of the rotor as to balance said bridge circuit.

7. An electric motor energizable from a source of unidirectional potential comprising
   a. a rotor having magnetic poles of opposite polarities thereon,
   b. a stator having a pair of flux-producing windings positioned in torque-producing relation with said rotor,
   c. a pair of Hall generators positioned in flux-sensing relationship to said magnetic poles,
   d. current applying means for applying the current to said stator windings in response to a signal from said Hall generators,
   e. means for changing the direction of current flow through said Hall generators to actuate the same, said current direction changing means having a pair of symmetrically interconnected semiconductor elements with a pair of input terminals,
   f. a Wheatstone bridge circuit having a pair of output terminals connected to said input terminals of said semiconductor elements, and g. feedback means for detecting the rotational speed of said rotor and feeding back the signal representative of the rotational speed to said bridge circuit so that the magnitude of the output of said bridge circuit becomes substantially zero for stopping the rotor when said bridge circuit is balanced, whereby the direction of the current flow through said Hall generators may be changed depending upon whether of the output signal of said bridge circuit is applied to one of a pair of input terminals of said pair of semiconductor elements or the other thereby automatically changing the direction of rotation of said rotor.

8. An electric motor as defined in claim 7 said Wheatstone bridge circuit has a variable resistor inserted into one of the arms thereof so that the resistance of said variable resistor may be controlled in response to the output signal of said feedback means.

9. An electric motor as defined in claim 7 wherein said current applying means has semiconductor elements interconnected between said Hall generators and said windings so that the application of current to said windings (or energization of said windings) may be controlled in response to the outputs of said Hall generators.

10. A DC motor and control system therefor comprising, in combination, a. a rotor having magnetic poles of opposite polarities thereon, b. a stator having a pair of flux-producing windings positioned in torque-producing relation to said rotor, c. a pair of Hall generators positioned in flux-sensing relation to said magnetic poles, d. current applying means for applying the current to said stator windings in response to the signal from said Hall generators, e. a Wheatstone bridge circuit having a photoelectric cell inserted in one arm thereof and positioned behind an aperture control mechanism, and a pair of output terminals from which may be derived the control signal which determines the direction of rotation and speed of said rotor, f. Hall generator control means for controlling the direction of the current flow through said Hall generators, said control means comprising a circuit for detecting the code or polarity of the output signal of said bridge circuit, and a switching or commutation circuit connected to said Hall generators for determining the direction of the current flow through said Hall generators, and g. said aperture control mechanism being actuated in response to the signal representative of the rotational speed of said rotor in such a manner that said said bridge circuit may be substantially balanced.

11. A DC motor and control system therefor as defined in claim 10 wherein the output terminals of said Wheatstone bridge circuit are connected to feedback loop forming means which controls the magnitude of the output signals of said bridge circuit in response to the signal representative of the rotational speed of said rotor.

12. A DC motor and control system therefor as defined in claim 11 wherein said feedback loop forming means comprises means for detecting the rotational speed of said rotor, and means for feeding back the output signal of said detecting means to the output terminals of said bridge circuit.

13. A DC motor and control system therefor as defined in claim 10 wherein electric braking means for applying the brake to said rotor is connected to the input terminal of said Wheatstone bridge circuit, and comprises means for generating the signal representative of the rotational speed of said rotor, and means actuable in response to the signal from said signal generating means for controlling the level of the input signal to be applied to said bridge circuit.

14. A DC motor comprising a. a rotor having first and second magnetic poles of opposite polarities, b. a pair of armature windings electrically displaced by 90° relative to said rotor poles, c. a pair of signal generators for generating signals proportional to the angular position of said rotor, d. a driving circuit for applying torque-producing current to said pair of armature windings, e. means for connecting each of said signal generators to said driving circuit in such a manner that each of said signal generators supplies a control signal to said driving circuit to energize and armature windings and produce a driving torque on said rotor by supplying winding currents to said armature windings, and f. switching means for automatically switching the direction of current flow through said signal generators, said switching means including a switching or commutation circuit comprising semiconductor elements, said switching or commutation circuit having a pair of input terminals to which are applied a switching signal and a pair of output terminals connected to said signal generators in such a manner that the direction of the currents flowing through said signal generators may be automatically switched or reversed depending upon whether said switching signal is applied to one of said pair of input terminals or the other.

15. A DC motor as defined in claim 14 wherein said windings are ring-connected.

16. A DC motor as defined in claim 14 wherein said windings are star-connected.

17. A DC motor as defined in claim 14 wherein said pair of signal generators comprise a pair of Hall generators.

18. An electric motor energizable from a source of unidirectional potential comprising a. a rotor having magnetic poles, b. flux-producing windings positioned in torque producing relation with said rotor, c. control signal generators positioned in flux-sensing relationship to said magnetic poles to generate control signals for changing the direction of current flowing through said windings, d. current applying means for applying current to said windings in response to said control signals, e. switching means for automatically switching the direction of current flowing through said control signal generators, said switching means including a switching or commutation circuit which has a pair of input terminals to which are applied a switching signal and a pair of output terminals connected to said signal generators in such a manner that the direction of the current flowing through said signal generators may be automatically switched or reversed depending upon whether said switching signal is applied to one of said pair of input terminals or the other.

19. An electric motor energizable from a source of unidirectional potential comprising
  a. a rotor having magnetic poles,
  b. a pair of flux-producing windings electrically displaced by 90° relative to said rotor poles and positioned in torque-producing relation with said rotor,
  c. a pair of signal generators angularly spaced apart from each other by 90° and in magnetic relation to said rotor so as to sense the magnitude of the rotor flux density as a function of the angular position of said rotor and to generate control signals corresponding thereto,
  d. a pair of driving circuits for controlling the current applied to all of said windings in such a manner that when the rotor rotates through 180° the direction of the current flow is reversed thereby producing the torque and rotation of said rotor in the same direction,
  e. switching means for automatically switching the direction of current flowing through said signal generators,
     said switching means including a switching or commutation circuit which has a pair of input terminals to which are applied a switching signal and a pair of output terminals connected to said signal generators in such a manner that the direction of the current flowing through said signal generators may be automatically switched or reversed depending upon whether said switching signal is applied to one of said pair of input terminals or the other.

20. An electric motor as defined in claim 19 wherein said automatically switching means comprises
  a reverse torque generating circuit for causing said windings to produce the reverse torque,
  said reverse torque generating circuit being connected to said driving circuits in such a manner that said driving circuits are so controlled as to reverse the torque produced by said windings.

21. An electric motor energizable from a source of unidirectional potential comprising
  a. a rotor having a first and second magnetic poles of opposite polarities,
  b. a stator having a first and second flux-producing windings electrically displaced by 90° relative to said rotor poles and positioned in said stator in torque-producing relation with said rotor,
  c. first and second Hall generators positioned in fixed relation to said stator and angularly spaced apart from each other by 90° and in magnetic relation to said rotor so as to sense the magnitude of the rotor flux density as a function of the angular position of said rotor,
  d. driving control means having a single pair of driving circuits each including symmetrically interconnected semiconductor elements for controlling the current to be applied to all of said windings in such a manner that when the rotor rotates through 180° the direction of the current flow is reversed thereby producing the torque and rotation of said rotor in the same direction,
  e. means for generating control signals for reversing the direction of rotation of said rotor, and
  f. controlling means for automatically reversing the direction of the current flow through said Hall generators in response to said control signals,
     said control signal generating means comprising a Wheatstone bridge circuit having a pair of output terminals connected to said controlling means for generating signals which determine the direction of rotation of said rotor.

22. An electric motor energizable from a source of unidirectional potential comprising
  a. a rotor having first and second magnetic poles of opposite polarities,
  b. a stator having a first and second flux-producing windings electrically displaced by 90° relative to said rotor poles and positioned in said stator in torque-producing relation with said rotor,
  c. first and second Hall generators positioned in fixed relation to said stator and angularly spaced apart from each other by 90° and in magnetic relation to said rotor so as to sense the magnitude of the rotor flux density as a function of the angular position of said rotor,
  d. driving control means having a single pair of driving circuits each including symmetrically interconnected semiconductor elements for controlling the current to be applied to all of said windings in such a manner that when the rotor rotates through 180° the direction of the current flow is reversed thereby producing the torque and rotation of said rotor in the same direction,
  e. means for generating control signals for reversing the direction of rotation of said rotor, and
  f. controlling means for automatically reversing the direction of the current flow through said Hall generators in response to said control signals,
     said controlling means comprising a commutation circuit in which a plurality of semiconductor elements are symmetrically interconnected and the output terminals are connected to said Hall generators.

23. An electric motor energizable from a source of unidirectional potential comprising
  a. a rotor having a first and second magnetic poles of opposite polarities,
  b. a stator having a first and second flux-producing windings electrically displaced by 90° relative to said rotor poles and positioned in said stator in torque-producing relation with said rotor,
  c. first and second Hall generators positioned in fixed relation to said stator and angularly spaced apart from each other by 90° and in magnetic relation to said rotor so as to sense the magnitude of the rotor flux density as a function of the angular position of said rotor.
  d. driving control means having a single pair of driving circuits each including symmetrically interconnected semiconductor elements for controlling the current to be applied to all of said windings in such a manner that when the rotor rotates through 180° the direction of the current flow is reversed thereby producing the torque and rotation of said rotor in the same direction, e. means for generating control signals for reversing the direction of rotation of said rotor, and f. controlling means for automatically reversing the direction of the current flow through said Hall generators in response to said control signals, said controlling means comprising skipping means interconnected between the output terminals of said Hall generators and said stator windings so that a predetermined sequence for energizing said windings may be skipped.

24. A control system for a DC motor having rotational torque-producing windings, said system comprising:

signal generators angularly spaced apart from each other and in motor speed sensing relation with said motor so as to generate control signals for switching or changing the direction of currents flowing through said windings, a motor driving control circuit for controlling the current to be applied to all of said windings in such a manner that when the rotor rotates through 180° the direction of the current flow is reversed thereby producing the torque and rotation of said rotor in the same direction, switching means for automatically switching the direction of currents flowing through said signal generators, said switching mesns including a switching or commutation circuit which has a pair of input terminals to which are applied switching signals and a pair of output terminals connected to said signal generators in such a manner that direction of the current flowing through said signal generator may be automatically switched or reversed depending upon whether said switching signal is applied to one of said pair of input terminals or the other.

* * * * *

UNITED STATES PATENT OFFICE
CERTIFICATE OF CORRECTION

Patent No. 3,831,072          Dated August 20, 1974

Inventor(s) KINZI TANIKOSHI

It is certified that error appears in the above-identified patent and that said Letters Patent are hereby corrected as shown below:

Column 1, line 20, after the word "motor" insert the word --with--;

Column 10, line 9, "utput" to read --output--;

Column 11, line 22, "pulsses" to read --pulses--;

Column 14, line 2, "generrators" to read --generators--;

line 29, "sigal" to read --signal--;

Column 20, line 12, "mesns" to read --means--.

Signed and sealed this 29th day of October 1974.

(SEAL)
Attest:

McCOY M. GIBSON JR.
Attesting Officer

C. MARSHALL DANN
Commissioner of Patents